United States Patent [19]

Fitzgerald

[11] 4,212,780

[45] Jul. 15, 1980

[54] POLYCHLOROPRENE NON-PHASING SOLVENT CEMENTS

[75] Inventor: Kenneth D. Fitzgerald, Sugarland, Tex.

[73] Assignee: Denka Chemical Corporation, Houston, Tex.

[21] Appl. No.: 899,080

[22] Filed: Apr. 24, 1978

[51] Int. Cl.$^2$ ... C08L 93/04; C08L 9/00; C08K 5/01
260/27 R; 260/33.6 PQ; 525/139; 526/213; 260/33.8 UA; 260/32.8 R; 260/31.2 R

[52] U.S. Cl. .................................. 260/27 BB; 260/25; 260/27 R; 260/33.6 PQ; 525/139; 526/213

[58] Field of Search ................ 260/27 R, 27 BB, 845, 260/33.6 PQ; 526/213; 525/139

[56] References Cited

U.S. PATENT DOCUMENTS

| | | | |
|---|---|---|---|
| 2,485,616 | 10/1949 | Long et al. | 526/213 |
| 2,486,183 | 10/1949 | Long et al. | 526/213 |
| 3,427,268 | 2/1969 | Fries | 260/25 |
| 3,872,043 | 3/1975 | Branlard et al. | 260/27 BB |
| 3,890,261 | 6/1975 | Fitzgerald | 260/27 R |
| 3,899,459 | 8/1975 | Branlard | 260/27 R |
| 3,929,703 | 12/1975 | Weymann | 260/27 R |
| 3,941,738 | 3/1976 | Denda et al. | 525/139 |
| 3,965,061 | 6/1976 | Bash et al. | 260/27 R |

OTHER PUBLICATIONS

Chatfield–Varnish Constituents–Leonard Hill Ltd. (London), 1953, pp. 204–209.

*Primary Examiner*—H. S. Cockeram
*Attorney, Agent, or Firm*—Kenneth H. Johnson

[57] ABSTRACT

Chloroprene polymer-phenolic resin-metal oxide-solvent adhesives, which are non-phasing and which contain from about 4 to 6 parts by weight based on polymer of a rosin which must contain less than 2.16 parts by weight based on polymer of dehydroabietic acid, a constituent of rosin.

20 Claims, No Drawings

POLYCHLOROPRENE NON-PHASING SOLVENT CEMENTS

BACKGROUND OF THE INVENTION

1. Field of the Invention

The present invention relates to adhesive compositions containing polychloroprene and the methods of preparing the polychloroprene and adhesive composition thereof.

2. Description of the Prior Art

Polychloroprene has been long used as an adhesive component. Adhesive and cement compositions comprising chloroprene polymer, metal oxide, modified phenolic resin and solvent, having high adhesive strength are well known. The cements are dispersions of insoluble components in a liquid phase which consists of the solvent and material soluble therein. In solvent cements containing chloroprene polymers, it is common practice to include the reaction products of certain basic metal oxides and heat reactive phenol formaldehyde resins. The reaction product forms a complex with the rosin acid resulting in a dispersion which upon standing stratifies into layers consisting of the complex of metal oxide, phenolic resin reaction product and rosin acid in the bottom phase and the chloroprene polymer in the top phase.

This stratification, often called "phasing", is inconvenient to the user because of the need to redisperse the stratified layer prior to use of the cement.

Phasing has been a problem for which numerous techniques for its elimination have been proposed, for example, U.S. Pat. No. 3,185,658 to Garrett, added an organic acid; U.S. Pat. No. 3,308,087 to Garrett used a carboxyl-containing chloroprene polymer; U.S. Pat. No. 3,318,834 to Tabibian added a polyisocyanate and U.S. Pat. No. 3,394,099 to Garrett used a high molecular weight phenol formaldehyde resin, free of low molecular weight components.

In 1969, U.S. Pat. No. 3,427,268 was issued to J. A. Fries which disclosed the preparation of contact cements which did not phase using chloroprene polymers containing no more than 2% rosin or rosin based derivaties, however the only examples were polymers from which the rosin acids had been extracted by a post-polymerization procedure.

Subsequent to the Fries patent, the primary art approach to overcoming polychloroprene phasing has been based on the same principle of limiting the amount of rosin acids, or removing them altogether.

However, when the rosin acids are reduced or removed from the polymerization system they must be replaced with another saponifiable organic acid or a surface active agent as disclosed, for example, in the following U.S. Pat. Nos.: 3,824,203, Tabibian, disclosed a quaternary system of (a) from 0.5 to 1.5% "disproportionated" rosin acid (b) from 1 to 2% of an unsaturated fatty acid (c) a standard amount of naphthalene sulfonate condensate, and (d) a methyl ester of wood rosin in the amount of 2 times (a)+(b). 3,872,043, Branlard et al, used (a) to 1.8 to 3% "disproportionated" rosin acid, (b) up to 1% fatty acid, and adds (c) to the polymerization system an amount of up to 2.5% rosin derivative tackifiers. 3,899,459, Branlard et al, uses up to 0.5% "disproportionated" rosin acid (b) up to 2.5% fatty acid (c) 3 to 6% dimerized (or polymerized) rosin acid or partially esterified rosin acids, most of which is added as a post-polymerization addition. 3,941,738, Denda et al, completely eliminated rosin acids and substituted salts of aliphatic substituted benzoic acid or certain nonionic polyoxyethylene ether or esters.

As the preceding patents indicate, wood rosin and its derivatives are the preferred components to the polymerization emulsification system because of the tack they impart to the polymer to be used as adhesives. Also, the worldwide polychloroprene industry has been established with a process which utilizes the rosin acids and inorganic base soap for the purpose of emulsification and processing.

Rosin acids may be modified to eliminate the conjugated unsaturation of abietic acid which is susceptible to oxidation. The three principal methods of modification and (1) dehydrogenation ("disproportionation"); (2) hydrogenation; and (3) dimerization or polymerization.

It should be noted that while unmodified rosin is included in the discussion of the above patents, unmodified wood rosin is never included in any of the examples.

It is an advantage of the present invention that standard and conventional recipes for preparing chloroprene polymers with rosin may be used for preparing polychloroprene for use in adhesives. It is a further feature of the present invention that stabilizing additives are not necessary nor required to prevent phasing of the solvent, modified phenolic resin, chloroprene cements. These and other advantages and features will be apparent from the following discussion.

SUMMARY OF THE INVENTION

An examination of the relevant prior art including that cited above will disclose that, although the various conventional forms of rosin acid or the salts thereof are discussed, i.e., unmodified rosin, "disproportionated" hydrogenated and polymerized, the work reported was largely carried out with the "disproportionated" rosin acids (this term although commonly used is misdescriptive and should more aptly be designated as "dehydrogenated", the principal acid in the "disproportionated" rosins being dehydroabietic acid).

It has been found that it is the presence of dehydroabietic acid in the adhesive composition in amounts greater than 2.16 weight % based on dry chloroprene polymer which causes the phasing that the prior workers have overcome in the ingenious and frequently cumbersome techniques disclosed above.

Briefly stated, one aspect of the present invention is a nonphasing chloroprene polymer adhesive composition comprising:

(a) 100 parts by weight of chloroprene polymer
(b) from 4 to 6 parts by weight, based on dry chloroprene polymer, of rosin selected from the group consisting of unmodified rosin, hydrogenated rosin, dehydrogenated rosin, polymerized rosin and mixtures thereof, provided said rosin contains less than 2.16 parts by weight of dehydroabietic acid based on dry chloroprene polymer,
(c) 1–50 parts by weight of basic metal oxide, and
(d) 5–100 parts by weight of phenolic resin, said (a), (b), (c) and (d) being admixed with an organic solvent so as to obtain a solids content of said adhesive composition of from 5 to 60%.

Preferably there are about 4 to 5, parts by weight of said rosin, preferably the unmodified rosin in the adhesive composition. A mixture of rosins would include, for example, dehydrogenated rosin (which, because of its high content of dehydroabietic acid, would be present in amounts below that necessary to produce a suitable rubber, i.e., less than 4 pph) and N wood rosin.

One means to obtain the requisite low levels of dehydroabietic acid is the use of rosin which has relatively smaller quantities of the dehydroabietic acid therein, such as Nancy Wood rosin, Gum rosin or Tall oil rosin. In these materials, the predominate acids are conjugated unsaturated acids, e.g., abietic acid, neoabietic acid and levopimaric acid. As used herein in relation to the rosin, the term "predominate acids" is used to mean 50% or more by weight. Employing such rosins in the conventional range for chloroprene polymer production, i.e., 3 to 5 parts by weight based on polymerizable production, i.e., 3 to 5 parts by weight based on polymerizable monomer and carrying the conversion to the usual range of 60 to 90%, the resultant dehydroabietic level in the polymer will fall at or below the upper limit allowable while the requisite amount of rosin remains in the polymer to provide tack properties to the adhesive.

Additional rosin may be added after the polymerization, however, the maximum amount of dehydroabietic acid as defined above must be observed. It is preferable that the recipe and reaction be conducted so as to provide the desired range of rosin in the adhesive to thereby avoid handling an additional adhesive component.

The process of preparing the adhesive compositions is also an aspect of the present invention which comprises:

polymerizing chloroprene in an aqueous emulsion in an emulsifying system containing rosin in the range of 3 to 5 parts by weight per hundred parts of polymerizable monomer, said rosin being selected from the group consisting of unmodified rosin, hydrogenated rosin, dehydrogenated rosin and polymerized rosin to produce a polymer of chloroprene containing from 4 to 6 parts by weight of said rosin and less than 2.16 parts by weight dehydroabietic acid based on dry polymer; separating said polymer; and mixing said polymer with basic metal oxide, phenolic resin and solvent in amounts to produce an adhesive composition.

DETAILED DESCRIPTION OF THE INVENTION AND PREFERRED EMBODIMENTS

Chloroprene

The term "chloroprene polymer" or "polymer of chloroprene" encompasses polymers in which chloroprene is the major or predominant monomer. Comonomers may also be employed such as 2,3-dichloro-1,3-butadiene; acrylonitrile, methyl methacrylate and so forth, if rapid crystallization is not a prerequisite of the intended end use. Usually, the total amount of ethylenically unsaturated comonomers will represent no greater than 25 mol percent of the total monomers and preferably will constitute less than 15 or 20 mol percent of the total monomers including chloroprene. The polymerization of chloroprene in aqueous emulsion is well known and any such system which does not interfere with the novel characteristics of this invention can be employed. Processes and methods for the polymerization and recovery of chloroprene are disclosed, for example, in Encyclopedia of Polymer Science and Technology, Vol. 3, page 705-730 (Interscience, 1965) and in numerous patents such as U.S. Pat. Nos. 2,264,173 and 2,264,191 both issued on Nov. 25, 1941.

Rosin

Rosin is a complex mixture of mainly resin acids and a small amount of nonacidic components. The rosin may be any of the various rosins such as gum rosin, wood rosin (including e.g., Nancy Wood rosin) or tall oil rosin or the modified rosins. Those rosin members may be of natural or synthetic origin. Modification may be by hydrogenation, polymerization or dehydrogenation and combinations thereof. The suitable rosins are those that have resin acids present and which have been used as emulsifiers in polychloroprene polymerization. Rosins and rosin derivatives are described in Vol 12 of Encyclopedia of Polymer Science, pp. 139–156 (Interscience, 1970) and Encyclopedia of Chemical Technology, Vol. 17, 2nd Ed. 1968, page 475 et seq.

Generally the unmodified rosins such as Nancy wood rosin, tall oil rosin and gum rosin are preferred. Nancy wood rosin is obtained from the oleoresin contained in the aged stump of the longleaf pine. Tall oil rosin is obtained from tall oil which is a by-product of the kraft paper industry. Gum rosin is obtained from the oleoresin exudate of the living pine tree.

The following are typical analyses of the major acid components of rosins:

Table I

| Rosin | Nancy Wood | Tall Oil | Gum | 731-SA[1] | Phedre V[2] |
|---|---|---|---|---|---|
| Isopimaric | | | | 15.1 | |
| Pimaric | 5.3 | 1.1 | .2 | 1.4 | 25.2 |
| Tetrahydroabietic | 1.4 | | 12.8 | 3.2 | |
| Dihydroabietic | 2.4 | 3.6 | 2.5 | 9.7 | |
| Paulustric and/or Levopimaric | 3.6 | 7.9 | 20.9 | .3 | 1.7 |
| Isopimaric | 14.5 | 4.5 | 8.5 | | |
| Abietic | 44.8 | 38.2 | 30.6 | | |
| Dehydroabietic | 15.4 | 34.5 | 9.5 | 63.80 | 51.4 |
| Neoabietic | 3.8 | 1.1 | 12.9 | .2 | |

[1] Dehydrogenated Nancy Wood rosin or equivalent, product of Hercules, Inc.
[2] Dehydrogenated Nancy Wood rosin or equivalent, product of Passicos Co.

Other surface active agents such as fatty acids and the condensation products of naphthalene sulfonic acids and formaldehyde are usually employed in the polymerization.

The polymerization may contain from about 0.2 to 1.0 parts by weight, based on monomer, of acid stable anionic sulfate or sulfonate surface active agents. Typical of these compounds are the salts of sulfated fatty alcohols, containing 8 to 18 carbon atoms, alkylbenzene-sulfonic acid containing 8 to 18 carbons atoms in the alkyl chains, or sulfated condensaters of ethylene oxide with phenol, $C_{8-18}$ alkylphenol, or $C_{8-18}$ fatty alcohols. These salts are used in conjunction with the condensation products of naphthalene sulfonic acids and formaldehyde.

The condensation products of naphthalene sulfonic acids and formaldehyde are described in U.S. Pat. Nos. 1,336,759; 2,046,757; and 2,264,173 and Blackley, High Polymer Latices, Vol. 1, pp. 103–5, 1966 (sometimes referred to herein as "condensation product" for convenience). The condensation product may be present in an amount of from 0.30 to 0.7 parts.

The described rosins and condensation products are at least partially or essentially completely converted to salts either prior to or during polymerization. Thus, the salt may be added as such or formed in situ. The compounds are usually salts of alkali metals or ammonia. For better stability and solubility the salts will be potassium, sodium or ammonium salts. The percentages are calculated based on the weight of the acid member rather than as the salt.

Polymerization

The usual methods may be employed to prepare an aqueous emulsion of the monomeric material, emulsifying agents and water.

The pH of the aqueous emulsion of polymerization may be varied depending upon the particular emulsification system employed and can be acidic, neutral or alkaline; however, it is preferred to have a pH in the range of about 7 to 13.5.

Conventional catalysts for chloroprene polymerization may be employed such as peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bisisobutyronitrile and the like. Suitable inorganic peroxides are such as inorganic per acids including per sulfates, perborates or percarbonates e.g., ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

Modifiers or other agents may be present in the emulsion. For instance, the polymerization may be carried out in the presence of sulfur or produce a sulfur modified polychloroprene. Also, chain transfer agents may be employed such as the dialkyl xanthogen sulfides and as the dialkyl xanthogen disulfides, alkyl mercaptans, e.g., dodecyl mercaptan, iodoform and benzyl iodide.

The degree of polymerization and characteristics of the polymer can be controlled as is known in the art.

The temperature of polymerization may be varied depending upon the particular type of polymer being employed with suitable ranges being from 0° C. to 40° C., with the preferred range being between 5° C. and 40° C. The polymerization may be short stopped by the addition of such agents as para-tertiarybutyl catechol and thiodiphenylamine, when the desired conversion is obtained. The resultant polymer solution is steam stripped to remove unreacted chloroprene, isolated by freeze roll and dried in an oven dryer as known in the art.

Adhesive Preparation

Solvent—Any of the solvents commonly used in preparing conventional chloroprene adhesives may be used in preparing the compositions of the present invention. The preferred solvents may be blends of two or more organic materials. Aromatic hydrocarbons, such as toluene and xylene, aliphatic hydrocarbons, ketones, esters and chlorinated hydrocarbons are all useful.

Phenolic resin—Heat-reactive phenolic resins are oil-soluble phenolics, which may be prepared by reacting one mole of a parasubstituted phenol with about one to two moles of formaldehyde in the presence of an alkaline condensation catalyst.

Phenols substituted in the para-position with alkyl groups having 3 to 8 carbon atoms are useful for preparing the resins (referred to herein as modified phenolic resins). Examples of suitable phenols include p-isopropyl phenol, p-tert-butyl phenol, p-cyclohexyl phenol, p-tert-amyl phenol and p-octyl phenol. Resins derived from p-tert-butyl phenol, which are used to produce "Bakelite" resin, are readily available. Modified phenolic resin is preferred.

Metal oxide—The resins react with basic metal oxides as known in the art. Magnesium oxide, calcium oxide and lead oxide have been employed. Magnesium oxide is preferred, since it has been found to give the best results. Generally, an excess of metal oxide over that which will react with the phenolic resin is present, usually at from 3 to 6 parts of metal oxide per part by weight of phenolic resin.

Zinc oxide is usually added to the adhesive compositions to serve as an acid acceptor and as a crosslinking agent in amounts from 2 to 20 parts by weight per 100 parts of chloroprene polymer. Other compounding aids such as antioxidants, accelerators, fillers and pigments may be used if desired.

The adhesive compositions of the present invention is accomplished by conventional procedures, such as to mill-mix the chloroprene polymer with compounding ingredients, except the resin, to dissolve the resulting compound and resin in a solvent in a suitable mixer. Alternately, the phenolic resin and metal oxide can be reacted separately in a portion of the solvent to be used in the final cement and added as a solution to the cement mixer containing the blend of polymer and other ingredients.

A typical recipe is as follows, with all parts by weight based on monomer:

TABLE II

| Chloroprene | 100.00 |
|---|---|
| 2,6-di-t-butyl-4-methylphenol | .10 |
| Rosin | 4.00 |
| Dodecyl mercaptan | .18 |
| $H_2O$ | 100.00 |
| Sodium hydroxide | .65 |
| Sodium salt of the condensate of formaldehyde and 2-naphthalene-sulfonic acid | .50 |
| Sodium salt of sulfated oleic acid | .25 |
| Sodium sulfite | .30 |
| Sorbitol | .25 |

The above material is emulsified and polymerization is carried out at 10° C. to 40° C. using a catalyst of 0.5% potassium persulfate with an activation catalyst of sodium hydrosulfite or sodium formaldehyde sulfoxylate if necessary, which will depend upon polymerization temperature and abietic acid content of the rosin. Polymerization is stopped at 80% conversion with an emulsion which contains 0.018 parts of phenothiazine and 0.40 parts of 2,2'-methylene-bis-(4-methyl-6-t-butylphenol). The unreacted monomer is removed by steam stripping and the polymer is isolated on a freeze roll and dried in an oven dryer.

Adhesives are prepared by making three separate mixtures as follows:

| | Parts by Weight |
|---|---|
| Toluene | 60. |
| Magnesium Oxide | 4. |
| Phenol-formaldehyde Resin* | 45. |

*GK1634 product of Union Carbide Corp.

This mixture is prereacted for 16 hours and then mixed with:

| | Parts by Weight |
|---|---|
| Toluene | 38. |
| Hexane | 196. |
| Acetone | 196. |

The following solid phase is dispersed in the above solvent phase:

| | Parts by Weight |
|---|---|
| Polychloroprene | 100. |
| Magnesium Oxide | 4. |
| Zinc Oxide | 5. |
| Antioxidant 2246 (2,2'-methylene bis (4-methyl-6-tert-butyl phenol)). | .5 |

The adhesive mixture contains the following parts by weight:

| | |
|---|---|
| Solvent | 75.0 |
| Polychloroprene | 15.3 |
| Magnesium Oxide | 1.2 |
| Zinc Oxide | .8 |
| Phenolic resin | 6.9 |

The adhesive mixture was placed in glass bottles and stored at ambient temperature (varied from 68°-73° F.). Visual examinations are made daily to determine if phasing has occurred.

Numerous compositions made up according to this receipt have shown no separation under these conditions after six months.

The following examples were prepared using the standard recipe listed in Table II, with the indicated rosin substituted for Tall oil rosin at a level of 3 parts per hundred based on monomer.

The level of rosin acid was reduced to below the claimed range in order to illustrate the critical level of dehydroabietic acid. This showing is seen by comparison of Examples III and IV. Note that the polymerization of Example IV was carried to a higher conversion to reduce the dehydroabietic acid below the critical level, and hence the rosin below an acceptable level, to avoid phasing. Those rosins having high amounts of conjugated acids and low dehydroabietic content, however, did not phase at the higher, acceptable concentrations.

not been observed to phase after storage for six months and more.

* The level of dehydroabietic acid in the adhesive is determined by multiplying the level shown in Table I for a given rosin times the rosin content in the dry polymer.

EXAMPLE I

The tall oil rosin contains 38.2% abietic acid and 34.5% dehydroabietic acid, so if the polymerization is started with 3 parts of tall oil rosin and the polymerization is stopped after 70% of the monomer is converted, the dry polymer will contain 4.3 parts of rosin acids of which 1.48 parts will be the dehydroabietic acid. Therefore, the dehydroabietic acid is below the level which leads to phasing.

EXAMPLE II

The partial phasing of the commercial adhesive type polymer would suggest a level of dehydroabietic acid between Example III and IV.

EXAMPLE III

Complete and rapid phasing with a 2.74% level of the dehydroabietic acid.

EXAMPLE IV

By increasing the monomer conversion from 70% to 88%, the rosin in the dry polymer is reduced to 3.4% of which 2.16% is the dehydroabietic acid and no phasing resulted in 24 weeks. The 2.16% would seem to be close to the maximum which can be tolerated without phasing.

EXAMPLE V

This is the Nancy Wood rosin counterpart of Example III, but no phasing occurred with the conjugated unsaturated abietic acid at a level of 1.93% and the dehydroabietic acid at 0.66%.

EXAMPLE VI

This is the Nancy Wood rosin counterpart of Example IV and would not be expected to phase. The dehydroabietic acid is 0.52% in the dry polymer.

EXAMPLE VII

This run was made with Tung oil which is mostly eleostearic acid. This example was included for a phasing reference since it is known that fatty acids per se do not cause phasing and to demonstrate the non-phasing effect of the conjugated unsaturation at a high level.

TABLE III

| Example No. | I | II | III | IV | V | VI | VII |
|---|---|---|---|---|---|---|---|
| Rosin | Tall Oil | (a) | 731SA[c] | 731SA[c] | N. Wood | N. Wood | b |
| % Monomer conversion | 70 | | 70 | 88 | 70 | 88 | 70 |
| % Rosin in dry polymer | 4.3 | | 4.3 | 3.4 | 4.3 | 3.4 | 4.3 |
| Phased in 24 weeks | no | yes | yes | no | no | no | no |
| % Phased | | 20 | 100 | | | | |
| Time to phase | | 9 weeks | 3 days | | | | |

[a] A commercial adhesive type polychloroprene believed made with conventional level of a "disproportionated" rosin.
[b] Tung acid (9,11,13-Octadecatrienoic acid).
[c] Dehydrogenated Nancy Wood rosin or equivalent, product of Hercules, Inc.

From the examples it can be seen that only those polymers made with "disproportionated" wood rosin, phased, and then only if the ratio of dehydroabietic acid to polymer exceeds the 2.16% level*. As noted above, compositions according to the present invention have Nancy Wood rosin and tall oil rosin both contain high percentages of conjugated unsaturated acids.

The invention claimed is:

1. A non-phasing chloroprene polymer adhesive composition comprising:
   (a) 100 parts by weight of a chloroprene polymer,
   (b) from 4 to 6 parts by weight, based on dry chloroprene polymer, of rosin selected from the group consisting of unmodified rosin, hydrogenated rosin, dehydrogenated rosin, and mixtures thereof, provided said rosin contains less than 2.16 parts by weight of dehydroabietic acid based on dry chloroprene polymer,
   (c) 1 to 50 parts by weight of basic metal oxide, and
   (d) 5 to 100 parts by weight of modified phenolic resin, said (a), (b), (c) and (d) being admixed with an organic solvent so as to obtain a solids content of said adhesive composition of from 5 to 60% by weight.

2. The adhesive composition according to claim 1 containing from about 4 to 5 parts by weight of unmodified rosin.

3. The adhesive composition according to claim 1 wherein said rosin comprises unmodified rosin.

4. The adhesive composition according to claim 1 wherein said rosin comprises hydrogenated rosin.

5. The adhesive composition according to claim 1 wherein said solvent comprises toluene.

6. The adhesive composition according to claim 1 wherein said basic metal oxide comprises magnesium oxide.

7. The adhesive composition according to claim 1 wherein (b) and (c) are unmodified rosin and magnesium oxide respectively and said solvent comprises toluene.

8. A process for preparing non-phasing chloroprene polymer adhesive composition comprising:
   polymerizing chloroprene in an aqueous emulsion in an emulsifying system containing rosin in the range of 3 to 5 parts by weight per hundred parts of polymerizable monomer, said rosin selected from the group consisting of unmodified rosin, hydrogenated rosin, and dehydrogenated rosin to produce a polymer of chloroprene containing from 4 to 6 parts by weight of said rosin and less than 2.16 parts by weight dehydroabietic acid, based on dry polymer; separating said polymer; and mixing said polymer with basic metal oxide, phenolic resin and solvent in amounts to produce an adhesive composition.

9. The process according to claim 8 wherein said polymer of chloroprene contains 4 to 5 parts by weight of said rosin.

10. The process according to claim 9 wherein said rosin comprises unmodified rosin.

11. The process according to claim 9 wherein said rosin contains conjugated unsaturated acids.

12. The process according to claim 11 wherein said conjugated unsaturated acids comprises 50% or more of the acids of said rosin.

13. A process for preparing chloroprene polymer for use in a non-phasing adhesive composition comprising:
   polymerizing chloroprene in an aqueous emulsion in an emulsifying system containing rosin in the range of 3 to 5 parts by weight per hundred parts of polymerizable monomer, said rosin selected from the group consisting of unmodified rosin, hydrogenated rosin and dehydrogenated rosin to produce a polymer of chloroprene containing from 4 to 6 parts by weight of said rosin and less than 2.16 parts by weight dehydroabietic acid, based on dry polymer.

14. The process according to claim 13 wherein said polymer of chloroprene contains 4 to 5 parts by weight of said rosin.

15. The process according to claim 14 wherein said rosin comprises unmodified rosin.

16. The process according to claim 14 wherein said rosin contains conjugated unsaturated acids.

17. The process according to claim 15 wherein said conjugated unsaturated acids comprises 50% or more of the acids of said rosin.

18. The adhesive composition according to claim 1 wherein (b) and (c) are unmodified rosin and magnesium oxide respectively and said solvent is selected from the group consisting of aromatic hydrocarbons, aliphatic hydrocarbons, ketones, esters, chlorinated hydrocarbons and blends thereof.

19. The adhesive composition according to claim 18 wherein said solvent comprises aromatic hydrocarbons.

20. The adhesive composition according to claim 18 wherein said solvent comprises aliphatic hydrocarbons.

* * * * *

UNITED STATES PATENT AND TRADEMARK OFFICE
CERTIFICATE OF CORRECTION

PATENT NO. : 4,212,780
DATED : July 15, 1980
INVENTOR(S) : Kenneth D. Fitzgerald It is certified that error appears in the above—identified patent and that said Letters Patent is hereby corrected as shown below:

Column 2, line 15 reads "and (1)" but should read -- are (1) --

Column 4, line 51 reads "condensaters" but should read -- condensates --

Column 6, line 17 reads "invention is" but should read -- invention are --

Signed and Sealed this

Eighteenth Day of August 1981

[SEAL]

Attest:

GERALD J. MOSSINGHOFF

Attesting Officer

Commissioner of Patents and Trademarks